Dec. 29, 1953  RENÉ-JACQUES F. D. R. MOUTON  2,664,488
ARC WELDING ELECTRODE
Filed Aug. 14, 1950

INVENTOR.
R.J. F. D. R. Mouton
BY

Patented Dec. 29, 1953

2,664,488

UNITED STATES PATENT OFFICE 2,664,488

ARC WELDING ELECTRODE

René-Jacques Fernand Daniel Robert Mouton, Uccle, Belgium, assignor to Soudometal Societe Anonyme, Forest-lez-Bruxelles, Belgium Application August 14, 1950, Serial No. 179,235

4 Claims. (Cl. 219—8)

The present invention relates to arc welding electrode comprising a coated steel core and being a continuation-in-part of my copending application Serial No. 116,172 filed September 16, 1949, now abandoned.

It is well known that in spite of the economical and technical advantages of direct butt welding of square edged plates, this method of assembly can only be carried out, in the case of the majority of the known electrodes, for pieces of a thickness of less than one quarter of an inch. In the case of two pieces forming an angle, the requirements of present good practice are satisfied if the weld fills the joint to the apex of the angle, in spite of the great advantage offered by a deeper and more positive penetration in order to reduce the exterior height of the deposited bead in this angle which is required to obtain the specified strength of the assembly.

Among electrodes which give a deeper penetration in the welded joint, there are those made of a high content of organic materials and used with the highest possible current, which permit the completion of a butt weld of two square-edged plates half an inch in thickness in two opposed runs. Similar results are obtainable with electrodes having four to five millimeters diameter metal cores and a thick coating with a high percentage of iron carbonate.

It should be noted that the use of all electrodes of the type known as "deep penetration" is very limited, and it has not as yet been found possible to use any of these on the same industrial scale as the standard types of electrodes.

The object of the present invention is to provide a type of "deep penetration" electrode suitable for the welding of a wide range of steels and which can be used on a large industrial basis.

Particularly, for the welding of steel of a tensile strength of 60,000 to 70,000 pounds per square inch, the electrodes which are the object of this invention offer the following original combination of advantages:

(a) It permits, even when the gauge of the core is number six or less, the butt welding of square-edged plates of thicknesses from one quarter to eleven sixteenths of an inch, with gaps of zero to one eighth of an inch, in two opposed runs in the flat position for a first embodiment and from one fifth to nine sixteenths in a second embodiment.

(b) It permits the welding of two plates forming an open angle, for instance an angle of ninety degrees, when the bisector of this angle is vertical or at forty five degrees from this position, giving a positive penetration up to $\frac{1}{4}''$.

(c) It permits, with a number ten or eight gauge core, the welding in the vertical downwards position of plates forming an open angle, for instance an angle of ninety degrees, giving a positive penetration up to $\frac{1}{8}''$, for the first embodiment.

(d) It can be used with a large number of existing welding sets providing that, for core gauges from number ten to six, it only requires an ampere range of one hundred to three hundred and fifty amperes and an arc voltage range of thirty five to sixty volts.

(e) It is easily handled, and melts at a speed up to sixteen inches per minute.

(f) It can be sold at a sufficiently cheap price to allow the user to realize a definitive economy of the welding costs.

(g) The quality of the welded assemblies fulfills the usual requirements of most of the inspecting and testing authorities.

The welding rod which is the object of this invention presents the combination of following characteristics:

(1) The outside diameter of the coating is equal to 1.7 to 2.3 times the diameter of the steel core.

(2) The composition of the coating is such that approximately five to thirty per cent of its weight is lost when it is heated in air during a period of one hour at a temperature of 850 to 950° Fahr.

(3) The chemical compositions of the coating and of the metal core are selected in such manner to give to the deposited metal, under normal conditions, a chemical composition fulfilling the following requirements: the maxima contents of carbon, sulphur, phosphorus, silicon and nitrogen are respectively: 0.08%, 0.035%, 0.035%, 0.25% and 0.015% whereas the manganese content is comprised between 0.40% and 2%.

(4) The coating contains silica, titanium dioxide, lime and magnesium oxide in such proportions that the ratio $$\frac{SiO_2 + TiO_2}{CaO + MgO}$$

is at least equal to 13.

Preferably, by weight, the coating contains ten to sixty per cent of metallic particles of the "same nature" as the metal core.

In the present patent, two metals are to be considered as being of the "same nature" when they have the same chemical composition for at least 80% of their weight.

In order that the coating of the electrode covered by this invention, suitably dried as for ordinary welding rods, may loose approximately five to thirty per cent of its weight by heating in air during one hour at a temperature between 850 to 950° Fahr., it is necessary that this coating contains materials, such as organic materials, which decompose at these temperatures and whose gaseous products resulting from this decomposition are in sufficient proportion to correspond to the loss of weight indicated above. All experienced welding rod makers know of these types of materials which have been previously proposed to be included in the composition of coatings, and, aware of the nature of aforesaid materials, they easily can determine the percentage to be used.

In a first embodiment, percentages of these materials are employed to ensure a loss of 10 to 30 per cent of the weight of the coating in the above mentioned heating conditions. Among the materials which serve this purpose, mention can be made of finely ground cellulose.

The minimum loss of weight of 10% as mentioned is necessary in order to secure the following technical advantages, (a) Good characteristics of use of the electrode while in vertical downwards position which requires at the same time an arc blast sufficiently powerful and a slag not too abundant. It is easily understood that these two conditions lead to giving to the coating a "minimum volatile character."

(b) A very great penetration in electrical conditions of use corresponding to the usual welding sets used. This leads to seeking an arc voltage of at least 40 volts and a gaseous discharge sufficient in order to hollow out a real furrow in the fused metal. This arc voltage depends upon the refractory character of the coating which is sufficiently determined by the degree of acidity defined by the ratio $$\frac{SiO_2 + TiO_2}{CaO + MgO}$$

being at least equal to 13.

As to the gaseous discharge necessary in order to hollow out a furrow in the melted metal it is also given by a relatively high "volatile character" of the coating.

It is also possible to secure a second embodiment with medium penetration, closely connected to the first one described above while making use of a coating capable of losing only 5 to 10% of its weight during subjection to a heat under the above conditions.

These electrodes however are not suitable for the welding of a vertical joint and give a penetration less strong than those above mentioned.

Nevertheless certain interesting fields of application are open to them particularly for the horizontal assembling of non-beveled sheets of an average thickness ($\frac{1}{5}$" to $\frac{3}{16}$"). In fact they present with respect to the other embodiment the advantage of allowing the completion of welding beads of smoother appearance and of a greater length for the same length of electrode.

The accompanying drawing shows, as examples only, two kinds of electrodes according to the invention.

Figure 1 shows a coated electrode consisting of a steel core 2 with a coating 3. As an example, to obtain this coating, dry powders are mixed according to the following proportions in weight:

Figure 1:
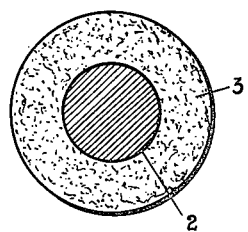
Figure 1 shows, on an enlarged scale, a transverse section in one type of electrode according to the invention.

20 to 55%, and for instance 48%, of iron powder having with advantage the following chemical composition: maxima contents of carbon, sulphur, phosphorus respectively, 0.10%, 0.03%, 0.03% and a minimum of 97% iron.

14 to 20%, and for instance 17%, of refined cellulose, with advantage in the form of finely ground powder.

25 to 66%, and for instance 35%, of a special mixture containing 35 to 75% and for instance 55% of titanium dioxide; 10 to 45% and for instance 22% of pure silica or re-fractory silicates containing at least 50% of silica; 5 to 25% and for instance 11% of manganese added with advantage in the form of pure manganese or an alloy of very low carbon and phosphorus content; 5 to 25% and for instance 12% of manganese dioxide.

Between the limits of weight given above for the various constituents of the mixture, the quantities of these constituents must be chosen in such a manner as to obtain for the coating an acidity degree $$\frac{SiO_2 + TiO_2}{CaO + MgO}$$

at least equal to 13.

The weights given by way of example between the above limits give this acidity degree.

A suitable quantity of binder (for example 8 to 8.5 cubic inches per pound of dry powders) is then combined with the mixture of dry powders described above. The binder should consist preferably of potassium and/or sodium silicate, the concentration and the viscosity of which depending, as is well known, on the type of extrusion press.

The paste thus formed is extruded with the metal core by a press developing preferably a unit pressure in the material chamber of at least 3500 pounds per square inch. The outside diameter of the coating 3 applied to the metal core is at least equal to 1.7 to 2.3 times the diameter of this core and, preferably, equal to 1.9 to 2.1 times this diameter.

The core 2 is a steel rod, as an example of mild rimmed steel of the following chemical analysis: the maxima contents of carbon, sulphur, phosphorus, silicon, and nitrogen are respectively of 0.08%, 0.03%, 0.03%, 0.02%, 0.01% with a minimum of 0.40% manganese, the remainder being iron.

After extrusion, the electrode is suitably dried, preferably at a temperature of less than 170° Fahr., in order to reduce the water content of the coating to a maximum value of 0.5% by weight.

When 8 to 8.5 cubic inches of potassium or sodium silicate per pound of dry powders of said composition have been added to these powders, there is obtained, after drying in the aforesaid conditions, an electrode whose coating contains approximately:

18 to 49% of iron powder
12 to 18% of cellulose
8 to 44% of titane dioxide
14 to 39% of silicates containing at least 50% of silica
1 to 15% of manganese
1 to 16% of manganese dioxide With the electrodes whose loss of weight is only from 5 to 10%, the thicknesses of sheets capable of being welded without preliminary beveling are from 1/5" to 9/16" (instead of from 1/4" to 1 1/8" for electrodes whose loss of weight is from 10 to 30%).

Below are two examples of the coating composition for such an average penetration electrode for horizontal welding. These examples give the composition of the dry mixture to which there is then added a suitable binder under the conditions indicated in connection with the previous type.

|  | I | II |
|---|---|---|
| Powdered iron | 20 | 20 |
| Cellulose | 7.5 | .5 |
| Rutile | 32 | 32 |
| Silica | 14 | 14 |
| Manganese | 11 | 11 |
| Oxide of manganese | 7 | 7 |
| Total | 91.5 | 89 |
| Loss of weight of the corresponding coating in percent | 8 | 5.5 |
| Arc voltage of the electrode in volts | 38/40 | 35/38 |
| Maximum thickness of the sheets capable of being butt welded without bevel in two opposed passes inches | 1/2 | 3/8 |
| Average length of the welding beads corresponding to an electrode inches | 8 | 9 |

Figure 2:
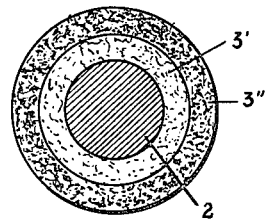
Figure 2 shows in a similar way a variation of this electrode.

In Figure 2, is shown a second type of electrode according to the invention in which the coating includes an inner layer 3' and an outer layer 3''. The inner layer 3' contains more than 35% of volatile materials. In this inner layer is found for instance 75% of finely ground cellulose. This inner layer 3' can also advantageously contain the larger amount of deoxidising agents, for instance, 100% of the total quantity of pure manganese existing in the complete coating.

The foregoing is to be considered as setting forth a few preferred embodiments only and is not to be construed as limiting the scope of the invention as defined in the appended claims.

What I claim is:

1. An arc welding coated electrode comprising a steel core, a coating around said core, said coating when normally dry having an outside diameter between 1.7 and 2.3 times the diameter of said steel core and such a composition that when it is heated in air for a period of one hour at a temperature of 850° to 950° F., it is subject to a loss of from approximately five to thirty percent by weight, said coating containing silica, titanium dioxide, and a substance taken from a group consisting of lime and magnesium oxide, said last named substance being present in such quantity that the ratio by weight $$\frac{SiO_2+TiO_2}{CaO+MgO}$$

is above 13.

2. An arc welding coated electrode comprising a steel core, a coating around said core, said coating when normally dry having an outside diameter between 1.7 and 2.3 times the diameter of said steel core and such a composition that when it is heated in air for a period of one hour at a temperature of 850° to 950° F., it is subject to a loss of from approximately ten to thirty percent by weight, said coating containing approximately ten to sixty percent by weight of metallic particles of the same nature as said metal core, silica, titanium dioxide, and a substance taken from a group consisting of lime and magnesium oxide, said last named substance being present in such quantity that the ratio by weight $$\frac{SiO_2+TiO_2}{CaO+MgO}$$

is above 13.

3. An arc welding coated electrode comprising a steel core, a coating around said core, said coating when normally dry having an outside diameter between 1.7 and 2.3 times the diameter of said steel core, said coating containing 18 to 49% of iron powder, 12 to 18% of cellulose, 8 to 44% of titanium dioxide, 14 to 39% of silicates containing at least 50% of silica, and 1 to 15% of manganese, and a substance taken from a group consisting of lime and magnesium oxide, said last named substance being present in such quantity that the ratio by weight $$\frac{SiO_2+TiO_2}{CaO+MgO}$$

is above 13.

4. An arc welding coated electrode comprising a steel core, a coating around said core, said coating when normally dry having an outside diameter between 1.7 and 2.3 times the diameter of said steel core, said coating containing 18 to 49% of iron powder, 12 to 18% of cellulose, 8 to 44% of titanium dioxide, 14 to 39% of silicates containing at least 50% of silica, and 1 to 15% of manganese.

RENÉ-JACQUES FERNAND DANIEL
ROBERT MOUTON.

References Cited in the file of this patent

UNITED STATES PATENTS

| Number | Name | Date |
|---|---|---|
| 1,115,317 | Kjellberg | Oct. 27, 1914 |
| 1,241,899 | Armstrong | Oct. 2, 1917 |
| 2,009,240 | Roberts et al. | July 23, 1935 |
| 2,146,320 | Walters, Jr. | Feb. 7, 1939 |
| 2,435,504 | Mathias | Feb. 3, 1948 |

FOREIGN PATENTS

| Number | Country | Date |
|---|---|---|
| 417,195 | Great Britain | Oct. 1, 1934 |